(12) United States Patent
Revankar

(10) Patent No.: US 6,549,680 B1
(45) Date of Patent: *Apr. 15, 2003

(54) METHOD AND APPARATUS FOR DESKEWING AND DESPECKLING OF IMAGES

(75) Inventor: Shriram V. Revankar, Webster, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,567

(22) Filed: Jun. 23, 1998

(51) Int. Cl.[7] .................................................. G06K 9/36
(52) U.S. Cl. ....................................... 382/289; 382/290
(58) Field of Search ................................ 382/289, 151, 382/290, 291, 294, 296, 284, 171, 176; 707/502

(56) References Cited

U.S. PATENT DOCUMENTS

| | | | | | |
|---|---|---|---|---|---|
| 5,001,766 A | * | 3/1991 | Baird | ........................... | 382/46 |
| 5,245,676 A | * | 9/1993 | Spitz | ........................... | 382/46 |
| 5,313,311 A | * | 5/1994 | Brandkamp | .................. | 358/474 |
| 5,321,770 A | * | 6/1994 | Huttenlocher et al. | ......... | 382/22 |
| 5,410,611 A | * | 4/1995 | Huttenlocher et al. | ......... | 382/9 |
| 5,506,918 A | * | 4/1996 | Ishitani | ....................... | 382/289 |
| 5,513,304 A | * | 4/1996 | Spitz et al. | ................... | 395/144 |
| 6,065,021 A | * | 5/2000 | George | ........................ | 707/502 |

* cited by examiner

Primary Examiner—Bhavesh Mehta
Assistant Examiner—Kanji Patel
(74) Attorney, Agent, or Firm—Oliff & Berridge, PLC

(57) ABSTRACT

A method and apparatus for determining skew in an image. The method and apparatus sample portions of an image using windows that are projected on the image. Connected components are generated from the sampled image data and projected. Based on the direction of the projected connected components, the skew of the image in at least one direction is determined.

33 Claims, 11 Drawing Sheets

A tree transformation facility using typed rewrite systems

Charles Farasuma*
July 1, 1988

Abstract

Tree rewrite systems with typed variables can be used to represent many tree transformations in a more compact form than systems with untyped variables. By building on the work of Eduardo Pelegri-Llopart, it is possible to generate linear-time optimal solutions to SET-REACHABILITY – a generalization of REACHABILITY with a possibly infinite goal set – for a useful class of typed rewrite systems. The algorithms developed can also handle some untyped systems that are not in BORS, such as systems with rules of the form $X \to a(X)$.

All experiment involving a rewrite system for instruction selection for the Motorola 1S8000 produced table sizes an order of magnitude larger than those produced by an untyped rewrite system for the same task. It is not clear whether this table size can be limited or if it is an inherent cost of the power given by types. Although discouraging for the instruction selection application, the table sizes are small enough (under 100k bytes) that the techniques may be useful for smaller applications, or in cases where the added expressibility of typed variables outweigh the size explosion of the tables.

---

* Sponsored by the Defense Advanced Research Projects Agency (DoD), Arpa Order No. 4871 (monitored by Space and Naval Warfare Systems Command under Contract No. X00039-84-C-0880), and an NSF Graduate Fellowship.

SKEW = θ

FIG. 1

METHOD AND APPARATUS FOR DESKEWING AND DESPECKLING OF IMAGES

BACKGROUND OF THE INVENTION

1. Field of Invention

This invention generally relates to determining an amount of skew or distortion in an electronic image.

2. Description of Related Art

Paper documents that are scanned by a scanner, copier or other device are often misaligned, or skewed, with respect to the imaging device. Thus, the resulting electronic image is skewed. For example, FIG. 1 shows an electronic image that has the text information skewed with respect to the image borders. That is, the text lines in the electronic image are not parallel to the top and bottom borders of the electronic image.

Skew in an electronic image is a problem because if the electronic image is printed or displayed without correction, the printed or displayed image will include the skew present in the electronic image.

Several methods have been proposed for determining the amount of skew, or skew angle, in electronic images. One such method represents each text character in an image by a point and projects all of the points in a number of pre-computed directions. The direction in which the maximum number of points are colinear with a family of parallel lines is considered the direction of the text lines. The angular difference between the direction of the text lines and the horizontal axis is the skew of the image. For example, FIG. 2 shows a graphic representation of such a skew evaluation of the image in FIG. 1. As shown in FIG. 2, a maximum number of text character points are colinear when projected at an angle θ. Thus, the skew of the electronic image is determined to be θ.

Other methods for determining the skew in a document image have been proposed. These methods statistically estimate the character width, intercharacter gaps, interword gaps, etc. and use the values to determine skew. While these methods may be effective for determining skew in images including lines of text, the methods are not effective when used with other image types, such as images of engineering drawings, like that shown in FIG. 3, which include few characters, words or word gaps that can be used to determine skew. Thus, the proposed methods for determining skew cannot accurately determine skew in the FIG. 3 image.

SUMMARY OF THE INVENTION

The invention provides a method and apparatus for determining skew in an electronic image that are effective for determining skew in document images including engineering drawings.

The invention provides a method for determining skew in an electronic image whereby portions of the image are sampled, and connected components are generated from the sampled portions. The connected components are then projected, and the skew of the image is determined based on the projected components.

In one aspect of the invention, a skew is determined based on the direction in which a maximum number of projected connected components in the image extend.

In one aspect of the invention, portions of an image are sampled using sampling windows that extend substantially across the image in a first direction, but do not extend substantially across the image in a second direction transverse to the first direction.

In one aspect of the invention, portions of the image are sampled using sampling windows that are transverse to each other.

In one aspect of the invention, the sampling windows extend substantially further across an image in a first direction than in a second direction transverse to the first direction.

In one aspect of the invention, connected components that extend in a first direction are generated using image data samples from sampling windows oriented transverse to the first direction.

In one aspect of the invention, a skew direction is determined based on a squared sum of projected components for each of a plurality of directions.

In one aspect of the invention, a skew is determined for at least two transverse directions in the image.

In one aspect of the invention, skew information is used to make image warp corrections to the image.

In one aspect of the invention, a skew is determined for different image regions within the image and used to correct the image.

The invention also provides an image processing device, such as a copier, that comprises an image data input device that inputs image data representing an image. A connected component generator samples the image data, and generates connected components. An image skew analyzer determines a skew of the image from the directions of projected connected components.

In one aspect of the invention, an image adjuster adjusts the image data based on the determined image skew.

In one aspect of the invention, the image processing device outputs an image based on image data adjusted based on a determined image skew.

BRIEF DESCRIPTION OF THE DRAWINGS

The invention will be described in relation to the following drawings, in which reference numerals refer to like elements, and wherein:

FIG. 1 is an electronic image of a text document that is skewed;

DETAILED DESCRIPTION OF PREFERRED EMBODIMENTS

The invention is described in relation to determining skew and despeckling an engineering drawing for convenience of reference. Although the invention is particularly useful with images of engineering drawings, the invention can also be used with other image types, such as text document, graphic or other images. However, the invention need not only be used to determine skew in an image. For example, the invention could be used to determine the relative angle between line segments in an image. As one example, the line segments could represent the trajectories of two or more aircraft approaching an airport.

Figure 4:
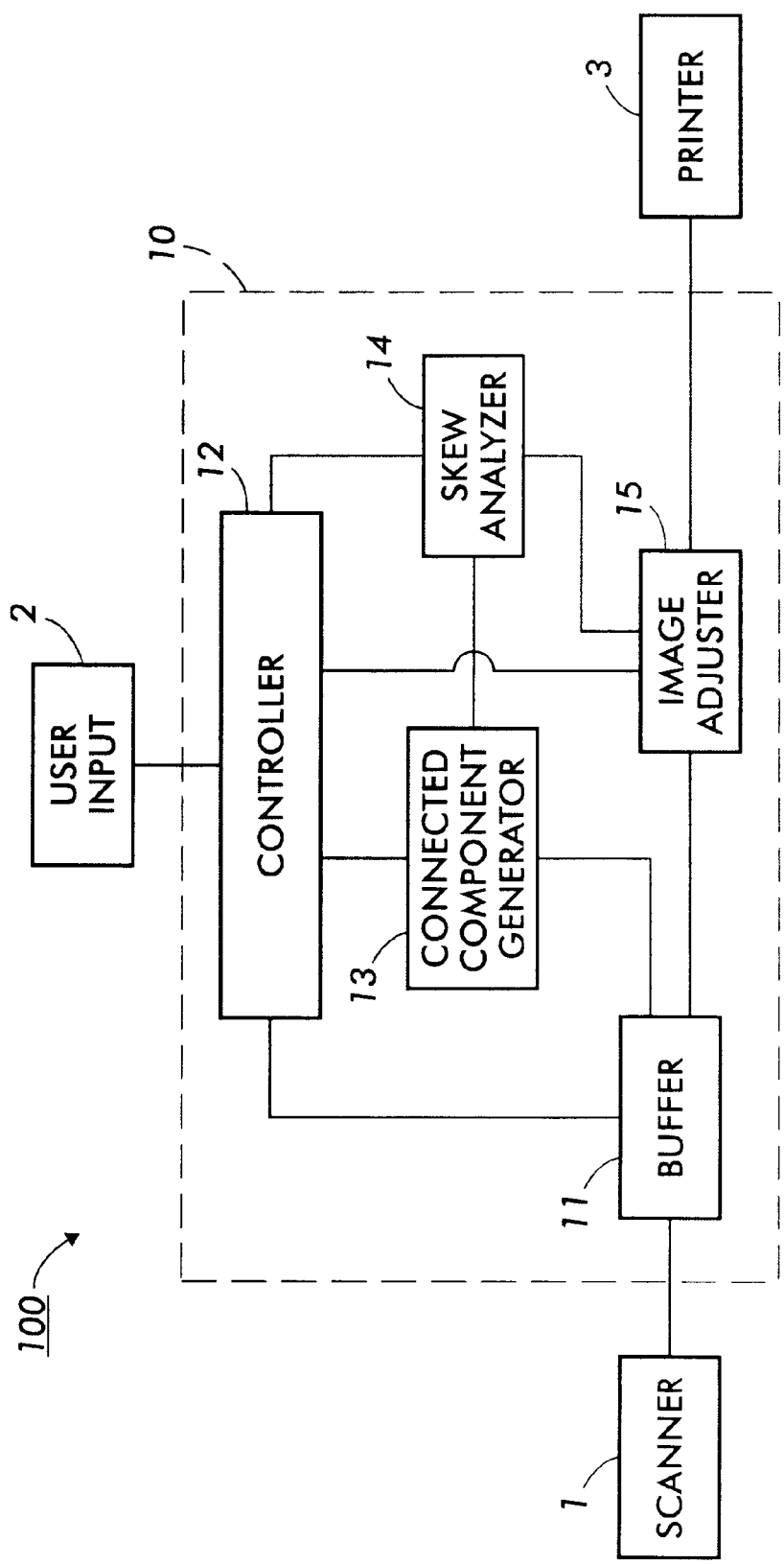
FIG. 4 shows an image processing system in accordance with the invention.

FIG. 4 shows a preferred image processing system 100 in accordance with the invention. The image processing system 100 is preferably a copier or other image forming apparatus, but can be an assembly of separate devices. The image processing system 100 preferably includes a scanner 1 that outputs image data representing a scanned document image to a general purpose computer 10. Although the image processing system 100 preferably includes a scanner 1, the scanner 1 is not necessary and can be replaced by any device that supplies image data, including volatile and non-volatile memory devices or communications devices, such as a wide-area or local-area network, a modem or other interface, etc. In short, any device capable of supplying image data to the general purpose computer 10 can be used in place of the scanner 1.

Image data that is input into the general purpose computer 10 is preferably stored in a buffer 11. The buffer 11 is preferably a semiconductor RAM, but can be any one of many different types of memory devices, including volatile and nonvolatile semiconductor memory devices, magnetic memory devices, a delay circuit or array of delay circuits, etc. Although the general purpose computer 10 preferably includes the buffer 11, the buffer 11 is not necessary and can be eliminated. In that case, image data is preferably supplied from the scanner 1 or other device at a desired rate to the general purpose computer 10.

The buffer 11 is preferably controlled by a controller 12. The controller 12, like the general purpose computer 10, can be implemented, at least in part, as a single special purpose integrated circuit (e.g., ASIC) or an array of ASICs, each having a main or central processor section for overall system level control, and separate sections dedicated to performing various different specific computations, functions and other processes under the control of the central processor section. The controller 12 and/or the general purpose computer 10 can also be implemented using a plurality of separate dedicated or programmable integrated or other electronic circuits or devices, e.g., hard-wired electronic or logic circuits such as discrete element circuits or programmable logic devices (including PLDs, PLAs, PALs or the like). The controller 12 and/or the general purpose computer 10 also preferably includes other circuitry or components, such as memory, relays, mechanical linkages, communications devices, etc. to effect desired control and/or input/output functions.

Image data that is input into the general purpose computer 10 is provided to a connected component generator 13. The connected component generator 13 creates connected components that are provided to a skew analyzer 14. The skew analyzer 14 determines the skew in the image represented by the image data based on the orientation of the connected components. The connected component generator 13 and skew analyzer 14 are preferably implemented as software modules that are executed by the general purpose computer 10. However, the connected component generator 13 and skew analyzer 14 can be implemented as an ASIC or array of ASIC's or other hard-wired circuitry, logic devices, etc.

To generate connected components, the connected component generator 13 preferably determines if each pixel value exceeding a defined threshold, e.g., the pixel is not a "white" pixel, in the image data is included in a selected portion, or window, of the image. Preferably, the connected component generator 13 uses vertical windows 21-1, 21-2, . . . shown in FIG. 5, and horizontal windows 21-11, 21-12, . . . shown in FIG. 6 to sample the image data. However, the windows 21 can have any one or more of various different shapes, as discussed below. If a pixel value is included in one of the windows 21, the connected component generator 13 determines if the pixel value is part of an existing connected component, i.e., is within a defined distance from another pixel value or values, or if a new connected component should be established based on the pixel value. Thus, the connected component generator 13 generates connected components 22 for the image that are basically groupings of pixels. Image pixels that are not included in one of the windows 21 are not used to generate connected components 22.

A skew analyzer 14 preferably projects each connected component 22 to determine the direction in which each connected component 22 extends relative to the vertical and/or horizontal axes of the image. The direction for each connected component 22 is preferably measured as an angle from a horizontal or vertical axis. For an image having no skew, the angle for many of the connected components 22, is zero relative to the nearest of the horizontal and vertical axes. Preferably, the skew analyzer 14 determines the skew based on the direction in which a majority of projected connected components 22 extend. However, the skew direction can be determined in other ways, as discussed below.

Based on the determination of the skew for the image by the skew analyzer 14, the image data is provided to an image adjuster 15 that corrects the image data based on the determined skew. That is, the image adjuster 15 preferably realigns, or rotates, the image so that any displayed or printed image created based on the corrected image data will appear without skew.

In this example embodiment, corrected image data is output to a printer 3 which prints the deskewed image. However, the printer 3 is not necessary and can be either eliminated or replaced with other printing devices, such as a monitor or other display device, or other devices, such as a memory or communications device.

The image processing system 100 also preferably includes a user input 2, such as a keyboard, mouse, monitor or other device that allows the controller 12 and a user to communicate. In this example, a user interfacing with the user input 2 can preferably instruct the general purpose computer 10 to input image data, print an image, perform specific image processing functions, etc. However, the user input 2 can be eliminated.

Having given a brief overview of the invention, a detailed description of the operation of the connected component generator 13 and the skew analyzer 14 is provided.

Figure 5:
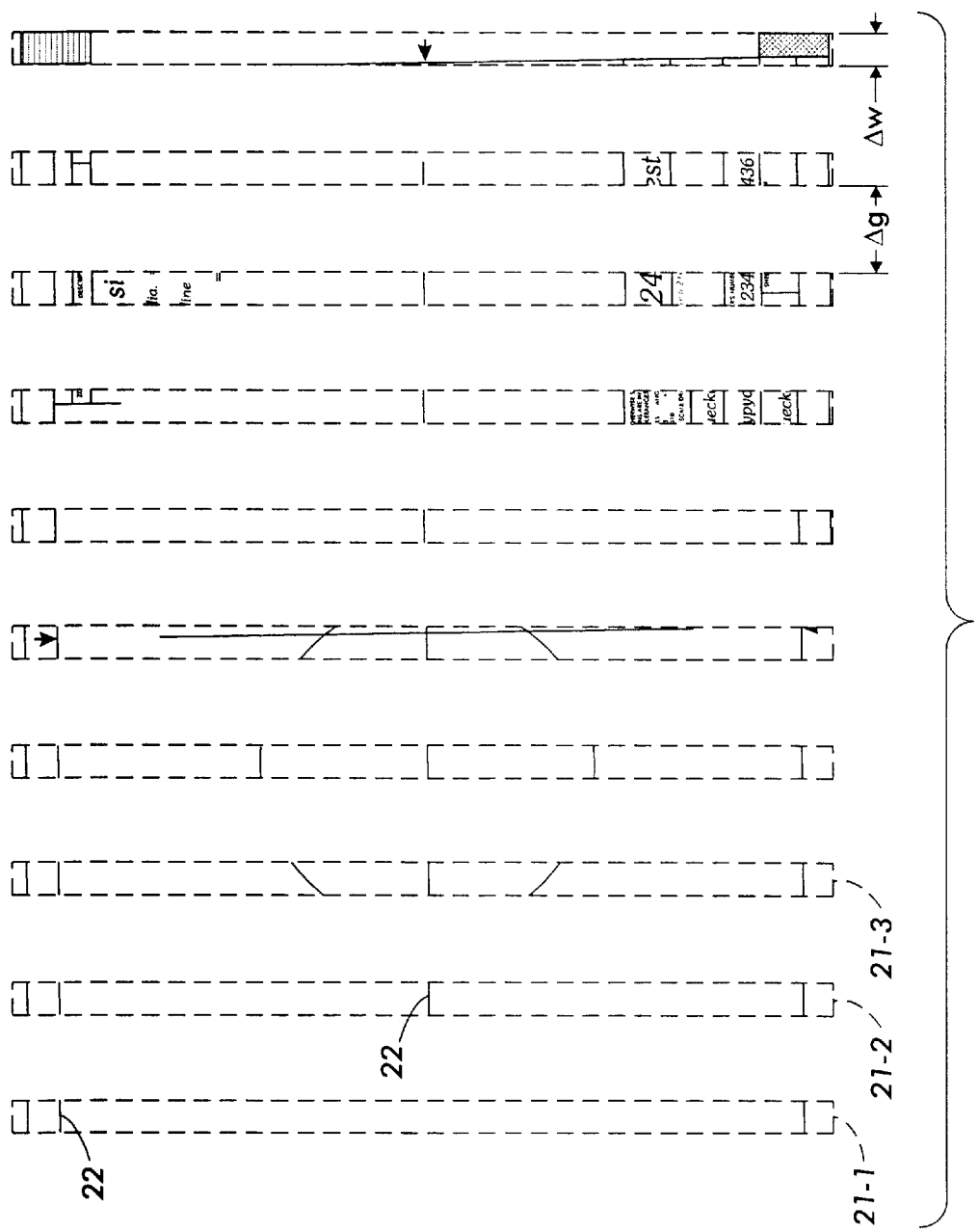
FIG. 5 shows example vertical sampling windows for sampling image data in accordance with the invention.
Figure 6:
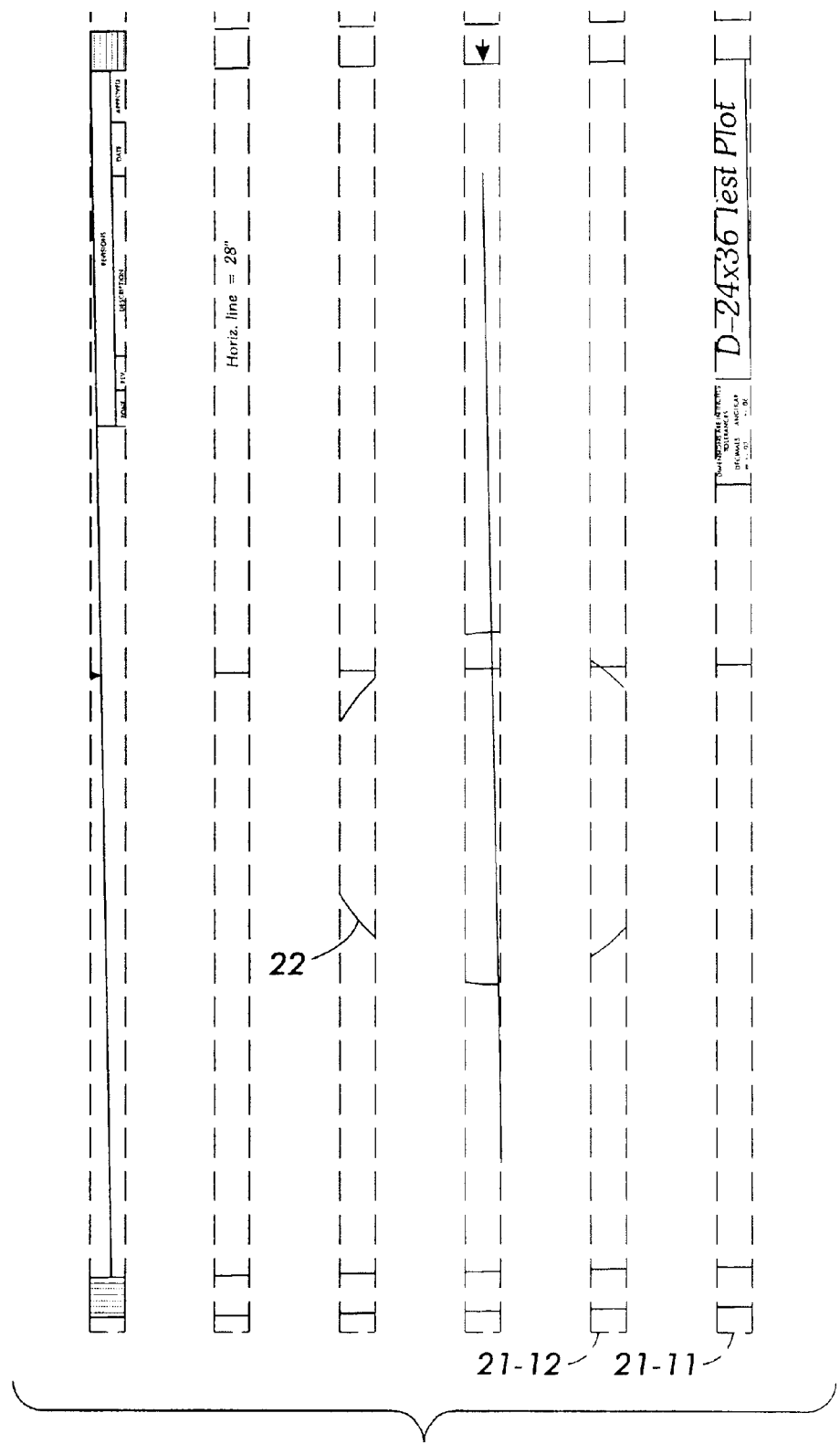
FIG. 6 shows example horizontal sampling windows for sampling image data in accordance with the invention.
Figure 7:
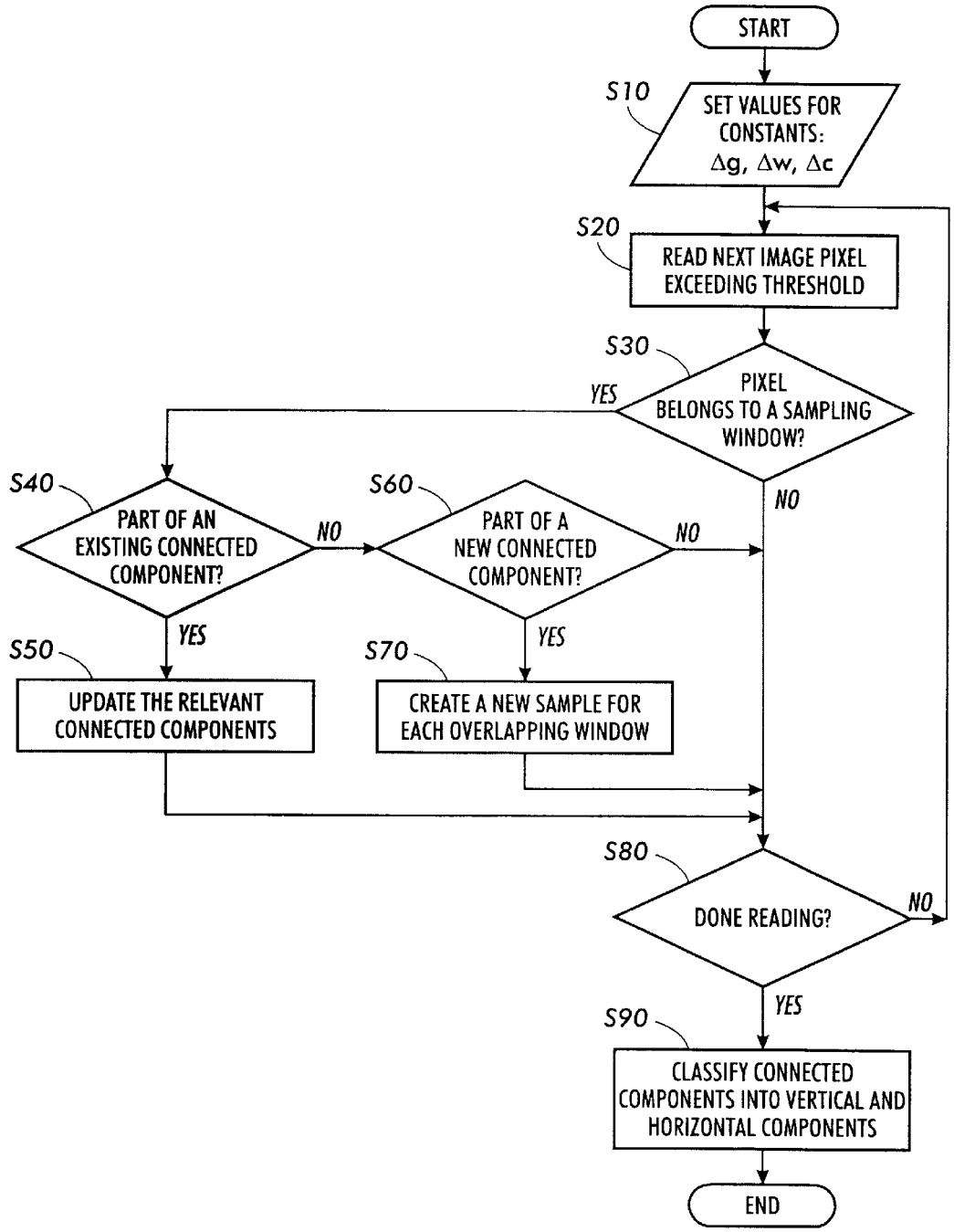
FIG. 7 is a flow chart of steps for sampling image data and generating connected components.

FIG. 7 is a flowchart that describes the operation of the connected component generator 13. In step S10, the connected component generator 13 sets values for the constants $\Delta g$, $\Delta w$ and $\Delta c$. As shown in FIG. 5, $\Delta g$ is the distance between windows 21. Preferably, $\Delta g$ is set at a value equal to 0.635*(resolution of image data in centimeters)+1. However, if the resolution of the scanned image data is different in the x and y directions, then $\Delta g$ is different for the vertical and horizontal directions. $\Delta w$ is the width of each window 21 and preferably is set at a value of 2. $\Delta c$ is defined as the maximum distance between each image pixel for the image pixels to be included in a single connected component 22, and preferably is set at a value of 1. If two image pixels are separated by a distance greater than $\Delta c$, e.g., the two pixels are separated by more than 2 "white" pixels, the two pixels are not included in a single connected component 22, unless the pixels are within $\Delta c$ of an intermediate pixel or pixels. Other methods can be used to define connected components 22, such as masking techniques, morphological processes, or any process that defines groupings of pixels. The preferred values for $\Delta g$, $\Delta w$ and $\Delta c$ identified above are chosen for images having relatively little noise, and are preferably adjusted for noisy images.

Preferably, the values for $\Delta g$, $\Delta w$ and $\Delta c$ are constant for all areas of the image. However, the values for these variables can be different for different image areas, thereby changing the window 21 size or spacing, or the maximum distance between pixels in a connected component 22.

In step S20, the connected component generator 13 reads an image pixel from the buffer 11. As discussed above, the buffer 11 can be eliminated, and the image pixel data can be provided directly from the scanner I or other device to the connected component generator 13. Preferably, the buffer 11 only stores image pixel values for a relatively small portion of the image. However, the buffer 11 can store all of the image pixel values for the entire image.

In step S30, the connected component generator 13 determines if the current pixel value belongs to a sampling window 21. If the pixel value belongs to a sampling window 21, control flows to step S40 where the connected component generator 13 determines if the pixel is part of an existing connected component 22. If the pixel does not belong to a sampling window 21, control jumps to step S80, where the connected component generator 13 determines if all image pixels have been read. If not, control jumps back to step S20.

In step S40, if the current pixel is part of an existing connected component 22, e.g. the pixel is within Ac of a connected component 22, the connected component generator 13 updates the relevant connected component or components 22 with the new pixel value. Preferably, connected components 22 are created and updated for each window 21. Thus, a single pixel value could be part of two or more connected components 22 if windows 21 overlap.

If the pixel is not part of an existing connected component 22, in step S60 the connected component generator 13 determines if the pixel is part of a new connected component 22. Preferably, a pixel is determined to be part of a new connected component 22 if the pixel is positioned in an area of intersection of vertical and horizontal sampling windows 21. However, other criteria can be used to identify if a pixel is part of a new connected component 22, such as masking and morphological techniques. If the pixel is part of a new connected component, in step S70 the connected component generator 13 creates a new connected component 22 for each overlapping window 21 in the horizontal, vertical or other direction.

When the entire image has been processed, in step S90 the connected component generator 13 preferably classifies each of the connected components 22 into vertical and horizontal components 22 based on the orientation of the window 21 used to generate the connected components 22. Preferably, horizontal components 22 are generated from vertical windows 21, and vice versa. Therefore, sampling biases are avoided by using connected components 22 generated from vertical sampling windows 21 for the computation of horizontal skew, and connected components 22 generated from horizontal sampling windows 21 for computation of vertical skew. Alternately, horizontal and vertical skew could be determined from all connected components 22 generated from any of the sampling windows 21. The classified connected components 22 are then either provided directly to, or stored for later use by, the skew analyzer 14.

Figure 8:
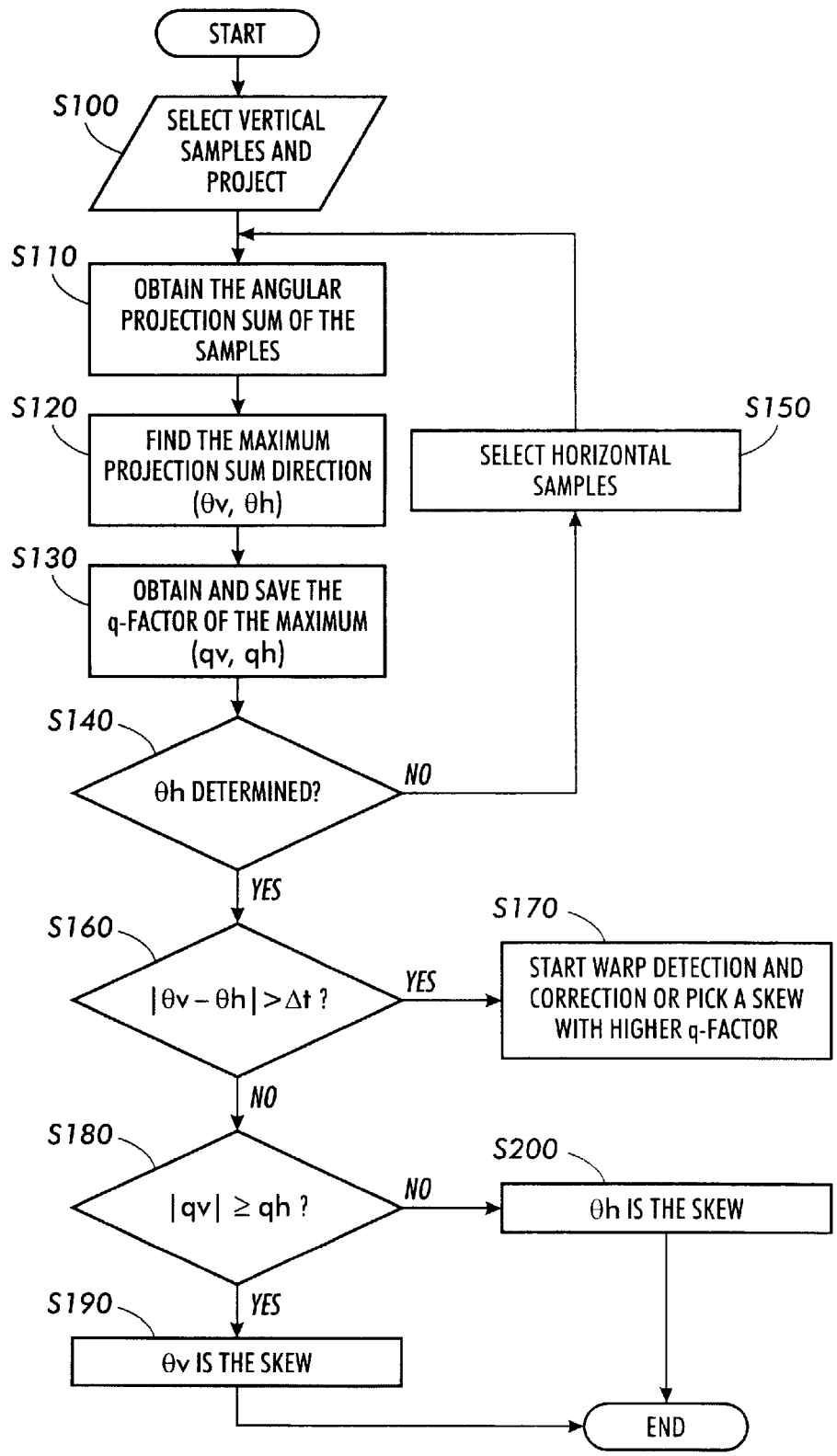
FIG. 8 is a flow chart of steps for evaluating connected components and determining skew in an image.

FIG. 8 is a flow chart describing the operation of the skew analyzer 14. In step S100, the skew analyzer 14 selects the vertical connected components 22 for analysis. Alternately, the skew analyzer 14 could select the horizontal connected components 22 or other connected components 22 before processing the vertical connected components 22. The skew analyzer 14 then projects each connected component 22 so that a direction for each projected connected component 22 can be determined. Preferably, the connected components 22 are projected by establishing a bounding box, e.g. a rectangular box of minimum size that completely contains the connected component 22, around the connected component 22 and extending one side of the bounding box that is substantially perpendicular to the window 21 used to generate the connected component 22. However, the connected components 22 can be projected by establishing a bounding box and selecting a side of the bounding box without extending the side. Alternately, the connected components 22 can be projected by determining a straight line that best represents the overall orientation of the connected component 22, or the ends of the connected components 22 could be extended to elongate the connected component 22.

In step S110, the skew analyzer 14 preferably calculates the squared sum of all connected components 22 for each direction, i.e. for each detected connected component 22 angle from the vertical axis. For example, the skew analyzer 14 calculates the squared sum of the number of connected components 22 that project in a first direction, e.g., one degree from the vertical axis, the squared sum of connected components 22 that project in a second direction, e.g., two degrees from the vertical axis, etc. Thus, if four connected components 22 project in a direction one degree from the vertical axis, the skew analyzer 14 will calculate a squared sum of 16 for the direction of one degree from the vertical. Preferably, the skew analyzer 14 calculates the squared sum for each measured direction of the connected components 22. However, the skew analyzer 14 could group connected components 22 that project in directions close to each other, and determine the squared sum of groups of connected components 22. For example, all connected components 22 that project in a direction between zero and 1 degree from the vertical could be grouped together, and the squared sum of the total number of connected components 22 computed. Preferably, the squared sum of projected connected components 22 is only computed for those components that project in a direction near the respective axis. For example, the skew analyzer 14 could only compute the squared sum of horizontal connected components 22 that are generated from vertical sampling windows 21, and that project in a direction within 45 degrees of the horizontal.

Although the skew analyzer 14 preferably computes the squared sum of projected connected components 22 for all detected directions, the skew analyzer 14 could compute a simple sum, or generate some other value based on any one or more various functions. For example, connected components 22 that are directed in or near a specified direction could be more heavily weighted compared to other connected components 22, or statistical analyses of the connected components 22 could be performed.

In step S120, the skew analyzer 14 determines the maximum squared sum of all of the sums determined in step S110. The angle $\theta v$ of the direction corresponding to the maximum squared sum is the vertical skew θv. As discussed above, if the skew analyzer 14 generates some other value based on the projected connected components 22, the skew analyzer 14 may determine the minimum value determined, or some other value to identify the vertical skew θv indicated by the projected connected components 22.

In step S130, the skew analyzer 14 determines a Q-factor qv for the skew determined in step S120. Preferably, the Q-factor is computed by computing a ratio of the maximum squared sum to an average value of the squared sums for directions close to the skew direction. For example, the average value could be determined as the average of the squared sums for directions within one degree of the skew direction determined in step S120. Alternatively, a more simple confidence metric could be used, such as the total number of connected components 22 that project in the skew direction, or that project in directions near the skew direction. However, other confidence metrics that indicate an objective or subjective level of confidence that the determined skew direction is correct can be used. For example, a user could input a value that represents a level of confidence through the user input 2.

In step S140, the skew analyzer 14 determines if the horizontal skew θh has been determined. If not, in step S150, the skew analyzer 14 selects the connected components 22 generated from vertical sampling windows 21, and performs steps S110–S130 to determine the horizontal skew angle θh and the Q-factor qh.

If the horizontal skew θh has been determined in step S140, control flows to step S160. In step S160, the skew analyzer 14 determines if the absolute value of the difference between the vertical and horizontal skews θv and θh is greater than a threshold Δt. Preferably, Δt is set at a value equal to 0.7, but can be set at other values depending on the type of image that is being processed or other factors. For example, Δt can be ignored, e.g., step S160 is skipped, if either qv or qh are less than 1.2. In step S170, if the difference between the vertical and horizontal skew θv and θh is greater than the threshold Δt, the skew analyzer 14 sends a signal to the controller 12 to start warp detection or correction, or the skew analyzer 14 selects one of the vertical and horizontal skew θv and θh which has the higher Q-factor as the skew for the image.

If the difference between the vertical and horizontal skew θv and θh is not greater than the threshold Δt, in step S180 the skew analyzer 14 determines if the Q-factor qv is greater than or equal to the Q-factor qh. If the Q-factor qv is greater than or equal to the Q-factor qh, in step S190 the vertical skew θv is determined as the skew direction for the image. Otherwise, the horizontal skew θh is determined as the skew for the image in step S200.

Figure 2:
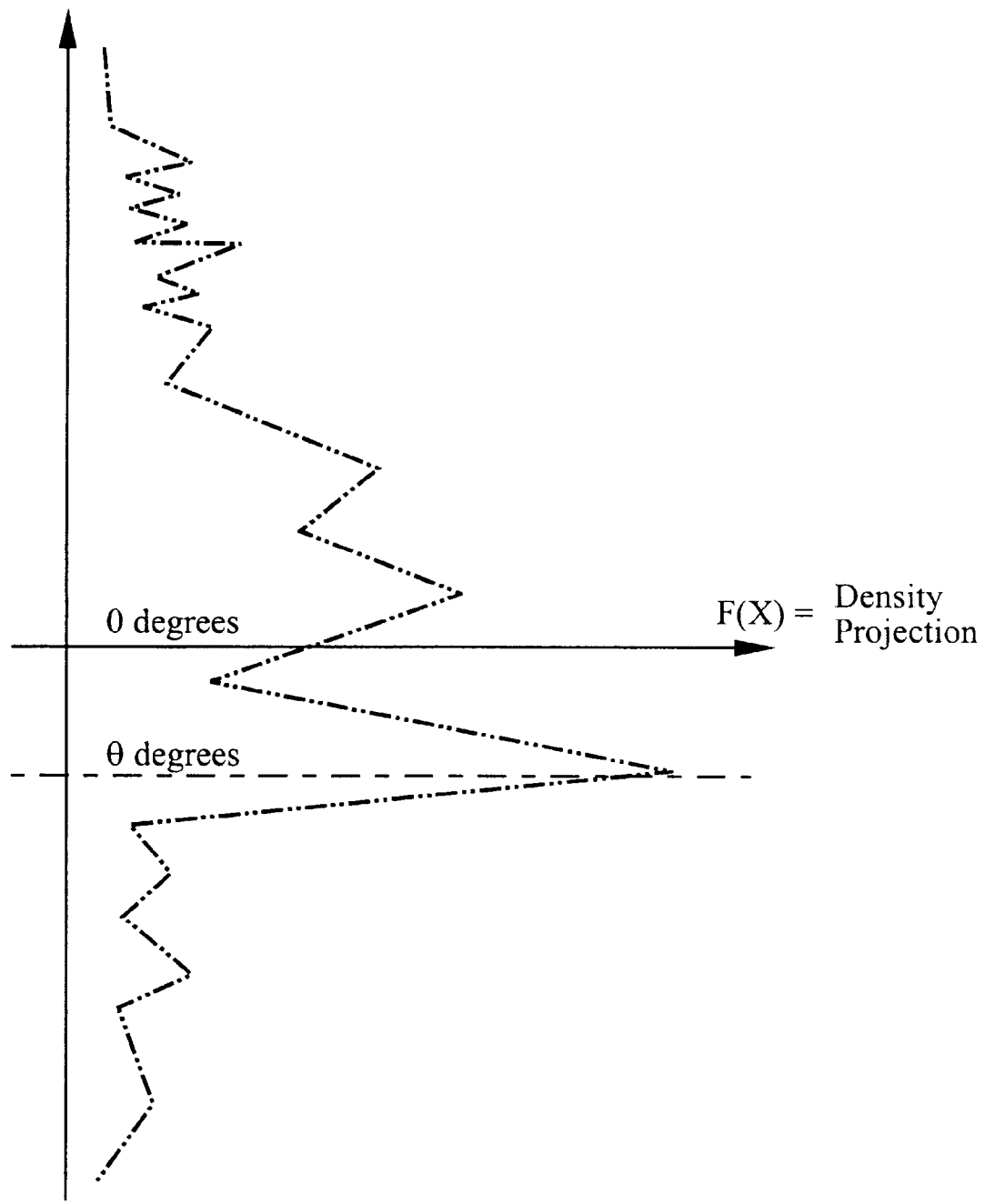
FIG. 2 is a graphical representation of a prior art method for determining skew in an image.
Figure 3:
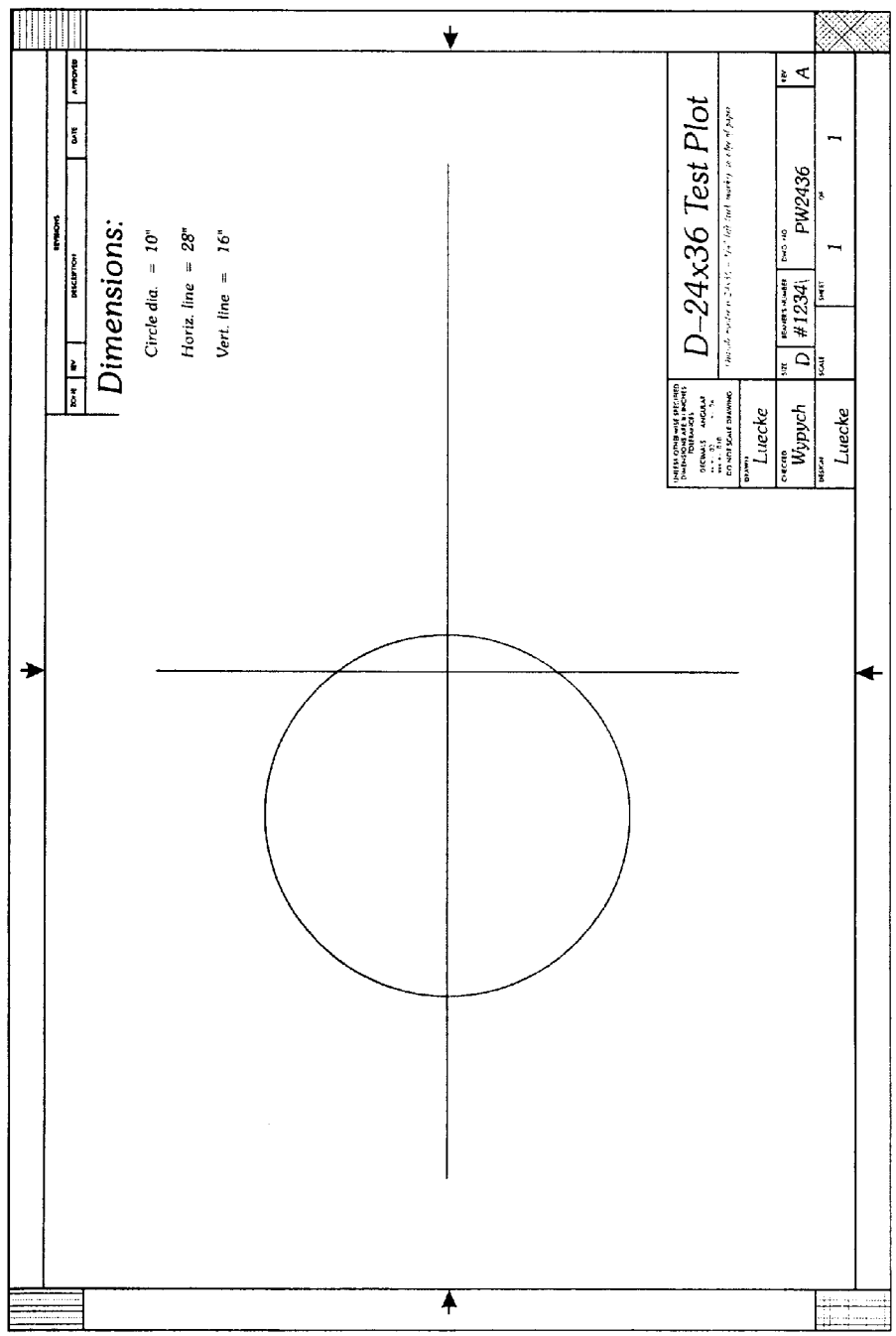
FIG. 3 is an example engineering drawing.
Figure 9:
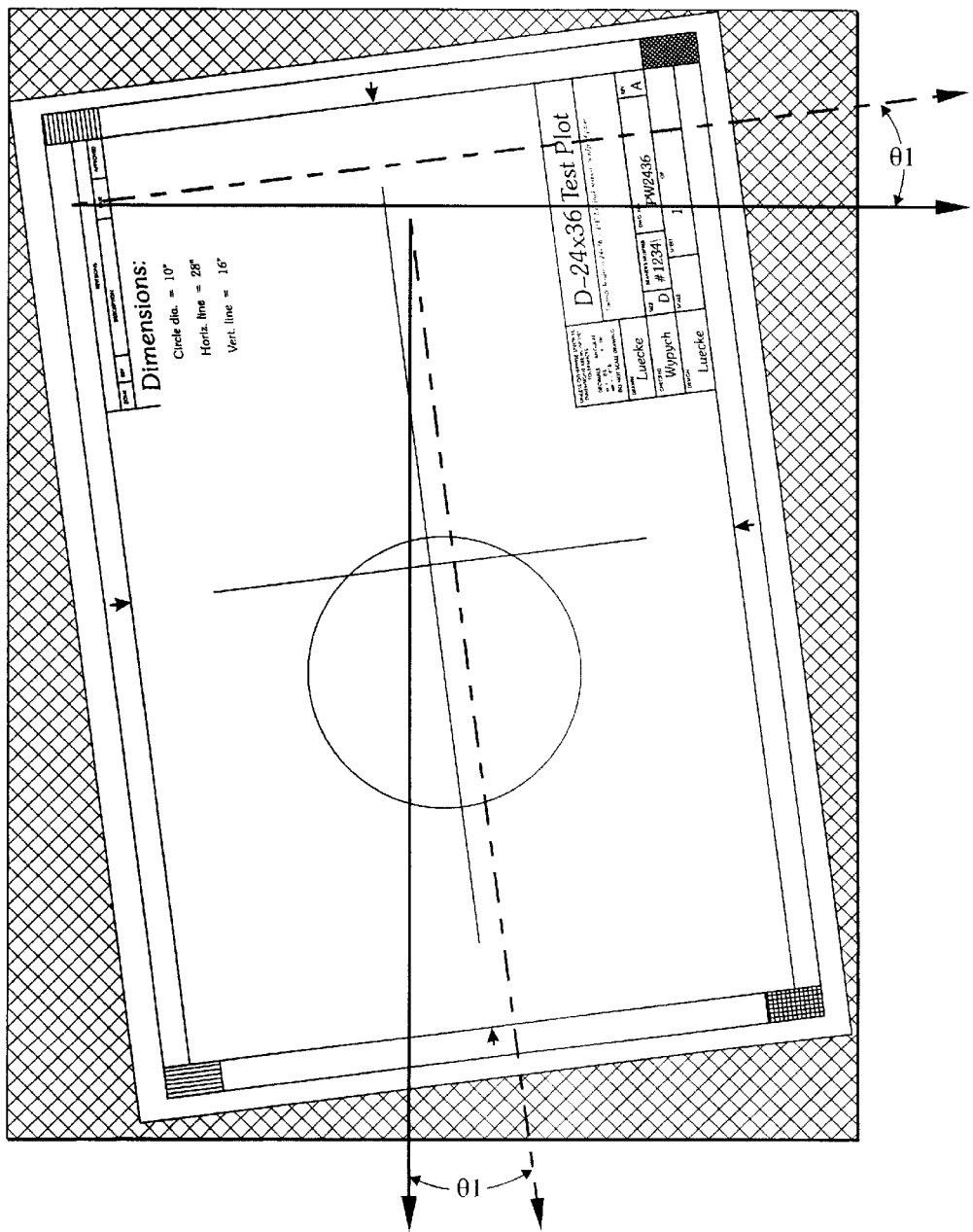
FIG. 9 is an example skewed image.

FIG. 9 shows a sample image where the document shown in FIG. 3 was scanned at an angle θ1 relative to the vertical and horizontal axes of the scanner. When image data representing the image shown in FIG. 9 is processed using the invention, the determined horizontal and vertical skew θh and θv are typically determined to be equal to each other and to θ1. Accordingly, with this information, the image shown in FIG. 9 can be adjusted to correct for the skew in the image by rotating the image by θ1.

Figure 10:
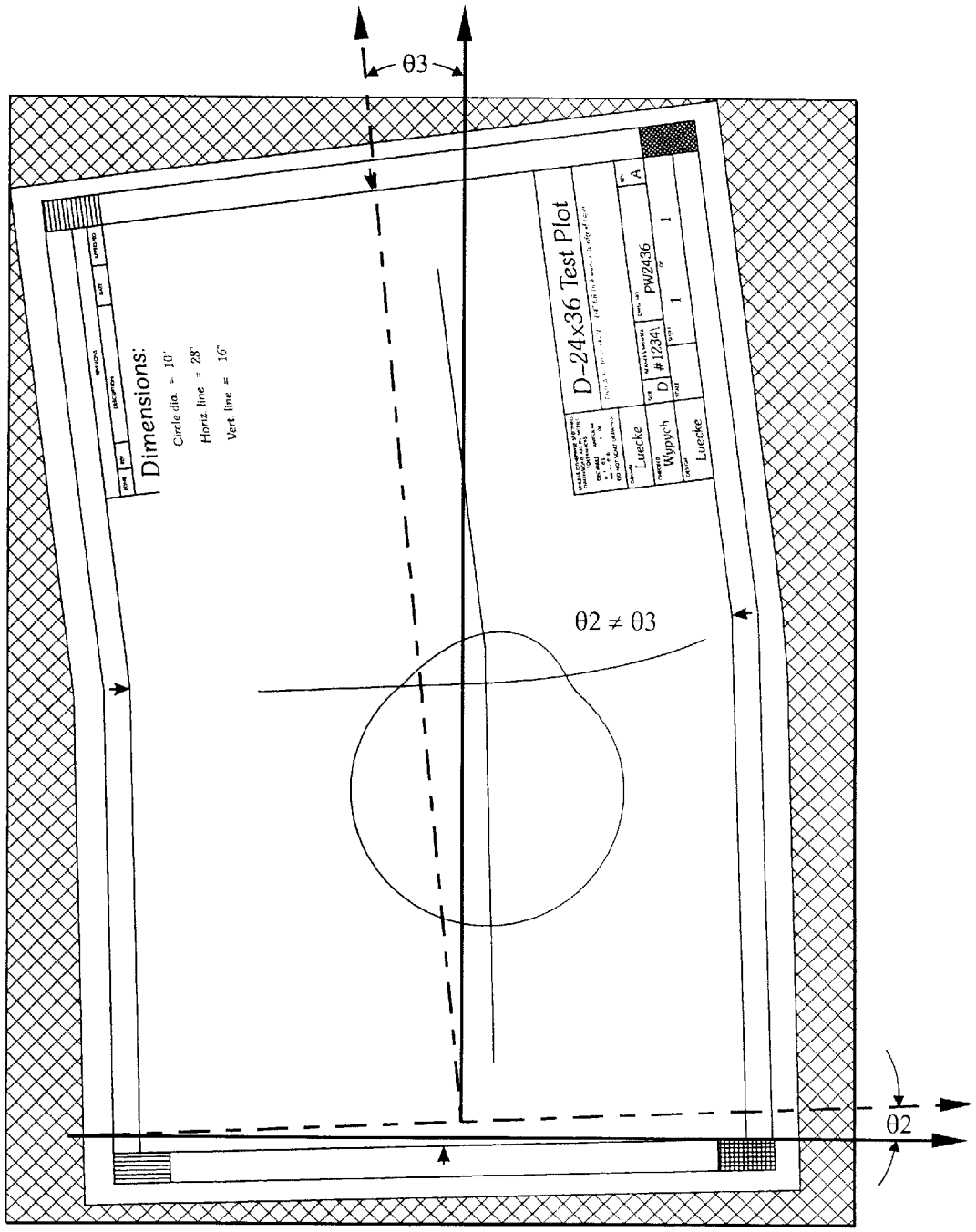
FIG. 10 is an example warped image.

FIG. 10 shows an example image that is warped. That is, the vertical skew θv, which is determined to be θ3, is not equal to the horizontal skew θh, which is determined to be θ2. In this case, if the image processing system 100 is equipped with warp correction techniques, the image shown in FIG. 10 could be corrected for the detected warp using known techniques. Alternatively, one of the vertical and horizontal skew θv and θh could be selected based on the determined Q-factors qv and qh and used to correct for skew in the image only.

Figure 11:
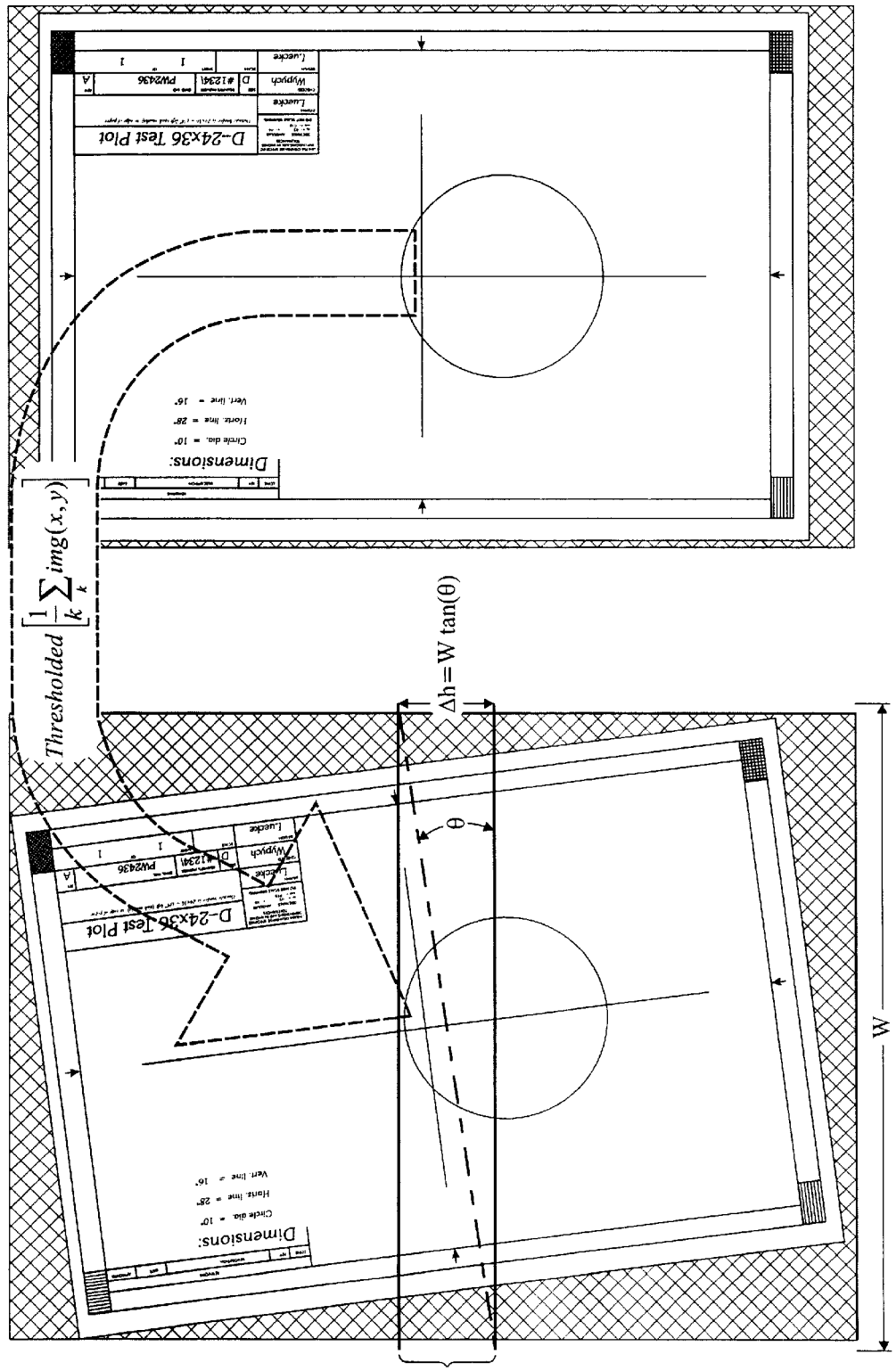
FIG. 11 shows a relationship between a skewed image and an associated deskewed and despeckled image.

FIG. 11 is used to describe an additional advantage and capability of the invention. As discussed above, the image processing system 100 only stores and uses connected components 22 that are generated from sampled portions of an image. Therefore, since the image processing system 100 need not store all of the data representing an entire image to determine the skew in the image, the size of the buffer 11 can be reduced, or the buffer 11 can be eliminated. After an image has been analyzed and a skew determined, the image can again be scanned by the scanner I or the image data otherwise provided to the image processing system 100 to correct the image skew without storing and processing all of the image data representing the image.

As shown in FIG. 11, only a portion of the raw image data must be stored in the buffer 11 for the image skew to be corrected because the storage size of the buffer 11 is proportional to tan(skew θ). That is, the image adjuster 15 only requires access to a relatively small amount of the image data to rotate the image in accordance with the determined skew and output corrected image data to the printer 3, for example. For example, when processing the image shown on the left in FIG. 11 that has a skew θ, the buffer 11 need only store image data representing a rectangular area of image data having a height Δh and a width W to output corrected image data representing the image on the right in FIG. 11.

Preferably, the image adjuster 15 also despeckles the image when processing the image data to correct for skew. When despeckling, i.e. removing noise from, the image data, the image adjuster 15 preferably determines an average gray value for each pixel location based on a number k of neighboring pixels. The average gray value is thresholded to produce the final output pixel value. Other well known image noise reduction techniques can be used as will be appreciated by those of skill in the art. Weighted averaging and anti-aliasing techniques can also be used on the target image to minimize rotational distortions caused by correcting for skew in the raw image data.

Although the invention has been described in connection with sampling windows 21 that extend across an image in either a horizontal or vertical direction, other sampling window 21 sizes and shapes can be used. For example, the sampling windows 21 need not extend entirely across an image in one direction. Instead, the sampling windows 21 may extend only partially across an image. In addition, the sampling windows 21 need not be rectangular. Instead, the sampling windows could be configured in any desired shape, either regular or irregular, to meet desired sampling requirements. Furthermore, the sampling windows 21 can be customized to analyze skew in different document image types. That is, the image processing system 100 could be equipped with a system that determines the type of image being processed or different object types within the image, and then uses sampling windows 21 that are specifically designed for determining skew in the image. In some cases, the sampling windows 21 may not all have identical shapes and sizes. That is, the sampling windows 21 may have a desired shape and size to detect skew in text regions of a document, but have other shapes and sizes for determining skew in graphic portions of a document, for example.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as set forth herein.

What is claimed is:

1. An image processing device, comprising:
   an image data input device that inputs image data representing an image;
   a connected component generator that selects portions of the image data and generates connected components from the selected portions, the selected portions selected according to a predetermined sampling pattern that is based on image data resolution, the selected portions comprising windows of the image data, the windows being separated by a predetermined distance, the windows having a predetermined size and shape, a total of the image data in the windows being less than a total of the image data in the input image from the input image device;
   a skew analyzer that determines a skew in an image based on the image data of the connected components; and
   a controller that controls the operation of the connected component generator and the skew analyzer.

2. The image processing device of claim 1, further comprising a text and graphic adjuster that adjusts the image data based on the determined skew.

3. The image processing device of claim 2, further comprising a memory to store one of the image data and adjusted image data.

4. The image processing device of claim 2, wherein the image adjuster removes image noise from the image data when adjusting the image data.

5. The image processing device of claim 1, wherein the connected component generator samples portions of the image data at full resolution.

6. The image processing device of claim 1, wherein the predetermined sampling rule is based on image resolution.

7. A method for determining skew in an electronic image, comprising:
   sampling a plurality of selected portions of image data representing the electronic image, the selected portions selected according to a predetermined sampling pattern that is based on image data resolution, the selected portions comprising windows of the image data, the windows being separated by a predetermined distance, the windows having a predetermined size and shape, a total of the image data in the windows being less than a total of the image data for the electronic image;
   generating connected components from the image data in the selected portions;
   projecting the connected components;
   determining a direction that each of the projected components extends in, relative to an axis of the image; and
   determining a skew for the image based on the determined directions of the connected components.

8. The method of claim 7, wherein sampling the selected portions of the image data comprises:
   sampling the image data using at least one first window that extends substantially across the image in a first direction, but does not extend substantially across the image in a second direction transverse to the first direction; and
   sampling the image data using at least one second window that extends substantially across the image in the second direction but does not extend substantially across the image in the first direction.

9. The method of claim 7, wherein the step of sampling portions of the text and graphic data comprises sampling using windows that are transverse to each other.

10. The method of claim 7, wherein sampling portions of image data comprises
    sampling the image data using at least one first window that extends across the image in a first direction farther than a second direction transverse to the first direction; and
    sampling the image data using at least one second window that extends across the image in the second direction farther than the first direction.

11. The method of claim 7, wherein the step of generating connected components comprises generating connected components that extend substantially in a first direction using sampled text and graphic data from windows oriented transverse to the first direction.

12. The method of claim 7, wherein the step of determining a skew comprises determining a maximum number of projected connected components that extend substantially in a same direction.

13. The method of claim 7, wherein the skew is determined based on a direction in which a maximum number of projected connected components extend.

14. The method of claim 7, wherein the step of determining a skew comprises determining a skew for at least two transverse directions in the image.

15. The method of claim 14, wherein the skew of the image is determined based on a skew direction having a maximum Q-factor, the Q-factor determined based on a number of projected connected components that extend in the skew direction and a number of projected connected components that extend substantially in a same direction as the skew direction.

16. The method of claim 15, wherein the Q-factor is a ratio of the number of projected connected components extending in the skew direction to an average of projected connected components that extend in directions near the skew direction.

17. The method of claim 7, further comprising the step of initiating image warp correction based on the determined skew.

18. The method of claim 7, further comprising the step of adjusting the raw image data based on the determined skew.

19. The method of claim 7, further comprising the steps of determining skew for a plurality of different regions in the image; and
    adjusting the image data based on the determined skew values.

20. The method of claim 7, wherein the sampling of the plurality of selected portions of image data representing the electronic image is performed at full resolution.

21. Image processing means comprising:
    image data sampling means for selecting, a plurality of portions of image data representing an image the selected portions selected according to a predetermined sampling pattern that is based on image data resolution, the selected portions comprising windows of the image data, the windows being separated by a predetermined distance, the windows having a predetermined size and shape, a total of the image data in the selected portions being less than a total of the image data representing the image;
    connected component generating means for generating connected components based on the selected portions of image data;

projecting means for projecting the connected components;

direction determining means for determining a direction in which each connected component extends relative to an axis of the image; and skew determining means for determining a skew of the image based on the directions of the projected components.

22. The image processing means of claim 21, further comprising:

window generating means for generating windows for sampling portions of the text and graphic data.

23. The image processing means of claim 22, wherein the window generating means generates windows that extend further across the image in a first direction than in a second direction transverse to the first direction.

24. The image processing means of claim 22, wherein the connected component generating means generates connected components that extend in a first direction based on sampled text and graphic data that is sampled based on windows that extend in a second direction transverse to the first direction.

25. The image processing means of claim 22, wherein the window generating means generates rectangular windows that are perpendicular to each other and extend across the image in at least one direction; and the connected component generating means generates connected components that extend in a first direction based on text and graphic data sampled using windows substantially perpendicular to the first direction.

26. The image processing means of claim 21, wherein the skew determining means determines the skew based on a number of projected connected components that are oriented substantially in a same direction.

27. The image processing means of claim 21, further comprising adjust means that adjusts the text and graphic data based on the determined skew.

28. The image processing means of claim 21, wherein the image data sampling means selects the plurality of the portions of the image data representing an image at full resolution.

29. The image processing means of claim 21, wherein the predetermined sampling rule is based on image resolution.

30. A method for determining skew in an electronic image, comprising:

sampling portions of image data, including text data and graphic data representing the electronic image;

generating connected components, each including at least a straight line, from the sampled text and graphic data;

projecting the connected components;

determining a direction that each of the projected components extends in relation to an axis of the image; and determining a skew angle for at least two transverse directions in the image based on the determined directions of the connected components.

31. The method of claim 30, wherein the at least two transverse directions are at least two orthogonal directions.

32. A method for determining skew in an electronic image, comprising:

sampling portions of image data, including text data and graphic data representing the electronic image;

generating connected components, each including at least a straight line, from the sampled text and graphic data;

projecting the connected components;

determining a direction that each of the projected components extends in relation to an axis of the image; and determining a skew angle for at least two transverse directions in the image based on the determined directions of the connected components, wherein the skew of the image is determined based on a skew direction having a maximum Q-factor determined based on a number of projected connected components that extend in the skew direction and a number of projected connected components that extend substantially in a same direction as the skew direction.

33. The method of claim 32, wherein the Q-factor is a ratio of the number of projected connected components extending in the skew direction to an average of projected connected components that extend in directions near the skew direction.

* * * * *